June 29, 1937.  A. J. DIESCHER  2,085,526
METHOD AND APPARATUS FOR ESTABLISHING AND CONTROLLING
A RESERVE STORAGE IN GAS TRANSPORTATION SYSTEMS
Filed June 28, 1932  2 Sheets-Sheet 1
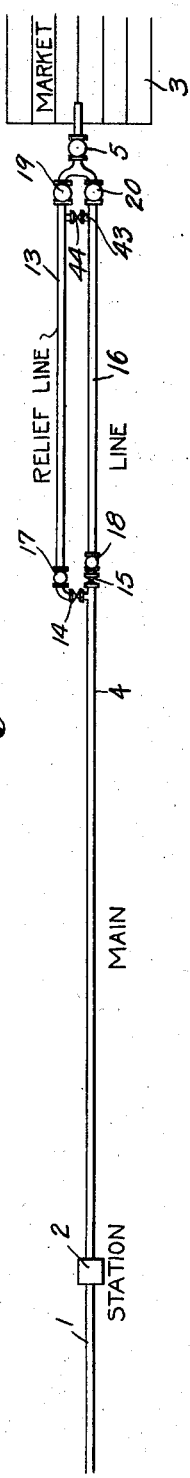
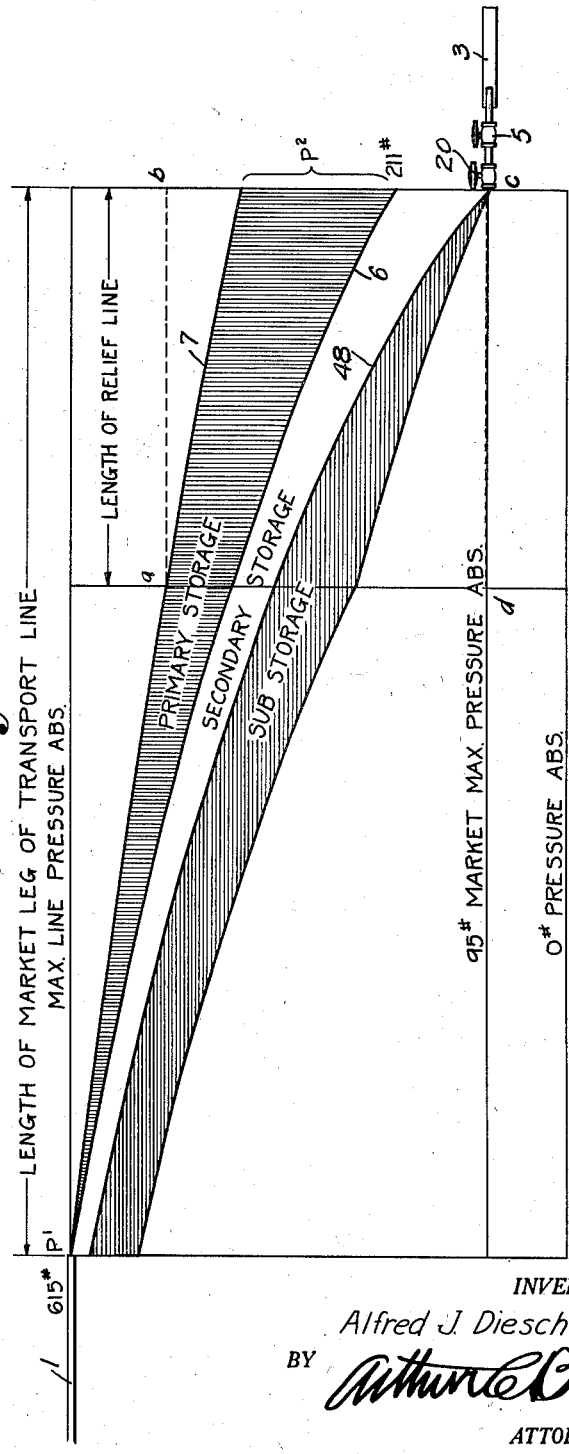
INVENTOR.
Alfred J. Diescher.
BY
ATTORNEY.

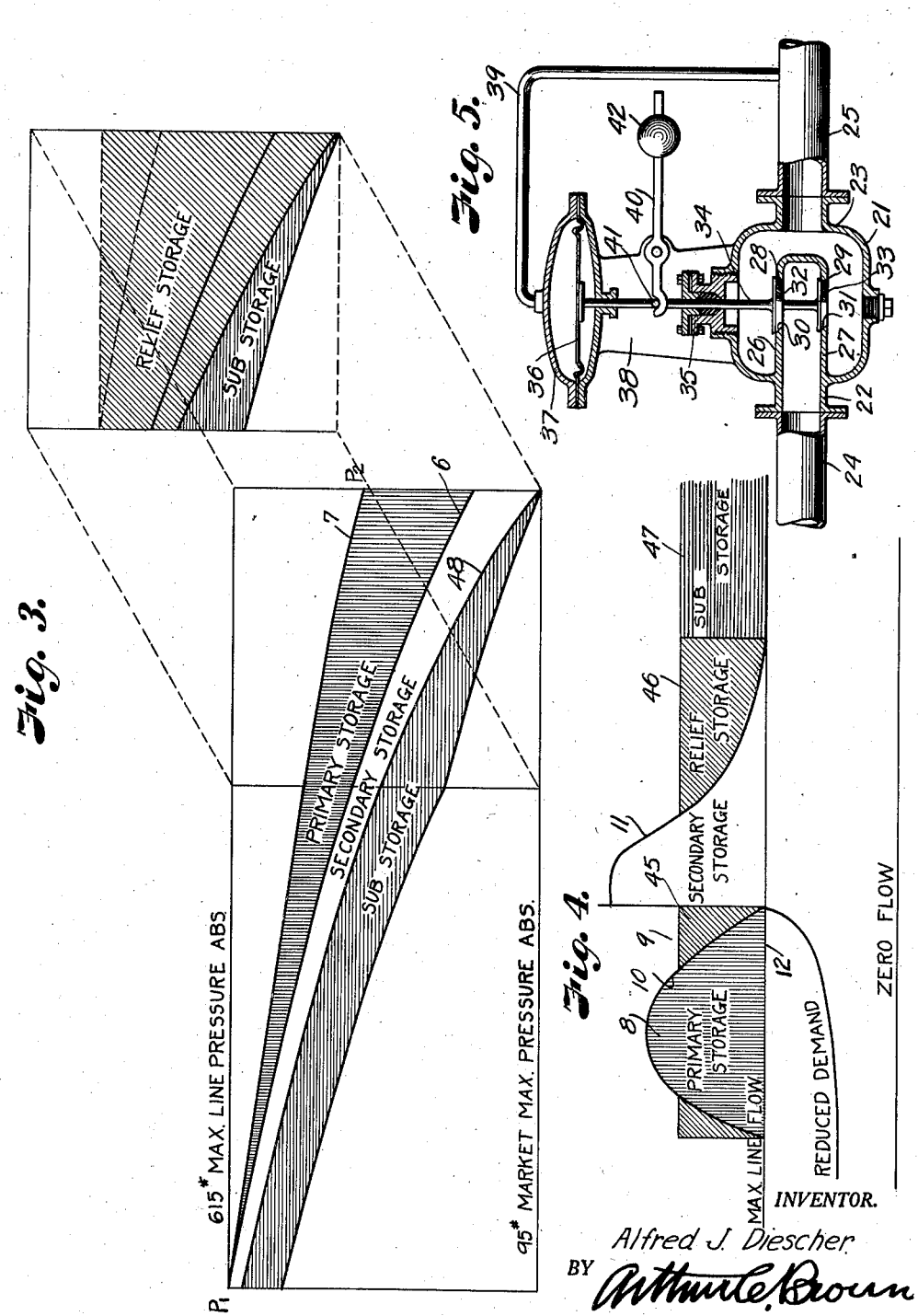

Patented June 29, 1937

2,085,526

UNITED STATES PATENT OFFICE 2,085,526

METHOD AND APPARATUS FOR ESTABLISHING AND CONTROLLING A RESERVE STORAGE IN GAS TRANSPORTATION SYSTEMS

Alfred J. Diescher, Winfield, Kans., assignor of one-half to M. L. R. Diescher, Winfield, Kans.

Application June 28, 1932, Serial No. 619,710

7 Claims. (Cl. 48—191)

My invention relates to gas transportation systems and particularly to a method and apparatus for establishing and controlling a reserve storage to meet excessive demands of the market supplied by the system.

The maximum transport capacity of a pipe line is of constant value based on the diameter and length of the line, the compressing stations' power and displacement, and the maximum pressure the market must have for its distribution, as well as the maximum pressure the line was designed for. The capacity is, therefore, fixed at the time of designing the transportation system, and it is impossible to increase the transport capacity much over its calculated value.

The market demand, on the other hand, varies widely through the seasons of the year and even the hours of the day. Some hours the market demands only a small per cent of the line capacity, while during other hours the demand is greatly in excess of the line capacity and may amount to as much as one hundred sixty per cent (160%) or more.

Under ordinary circumstances a sufficient volume of gas may be packed in the line during periods of low demand to help in meeting periods of higher demand, but continued excessive demand soon exhausts this storage and before secondary storage, which is afforded by operating the line at its normal rate of flow, can be availed of, there is a break in the service, resulting in distress and dissatisfaction on the part of the consumers, as well as loss to the transportation company, as it has been unable to continuously and adequately supply the volume of gas required by the market. This break in the service is caused by the fact that the line flow is a function of differences in inlet and outlet pressures. Thus the flow volume drops with increased pressure at the outlet of the line. Consequently, packed storage created in the line is at the expense of flow volume, and it is impossible to obtain maximum rated line flow while there is any packed gas in the line. It is first necessary to pull down the pressure at the delivery end of the line below that required to effect normal full rated flow, which requires time and causes a break in the service, before the secondary storage is available.

It is, therefore, the principal object of my invention to create a relief storage for filling in this gap or interruption to the service and to prolong the period over which excess loads may be carried, thereby increasing the efficiency of the service and enlarging the market which may be safely supplied by the pipe line.

It is a further object of the invention to reduce the hazard of interrupted service caused by line breaks near the market.

Another important object of the invention is to provide a sub-storage to supplement the primary and secondary storages.

In accomplishing these and other objects of my invention, I have provided improved details of structure, the preferred arrangement of which is illustrated in the accompanying drawings, wherein:—

Fig. 1 is a diagrammatic view of the market leg of a gas transportation line equipped with a relief line in accordance with my invention.

Fig. 2 is a diagrammatic view of the market leg of the line, illustrating the primary, secondary, and sub-storage pressures.

Fig. 3 is a similar view illustrating the relief storage for supplementing the primary and secondary storages normally obtainable in the market leg of the line.

Fig. 4 is a diagrammatic view illustrating the break between the primary storage and the secondary storage, and the relief storage filling in the break and supplementing the primary and secondary storages.

Fig. 5 is a vertical, sectional view through one of the pressure regulators.

Referring more in detail to the drawings:—

1 designates a main trunk line of a gas transportation system in which compressor stations 2 are inserted at intervals along the line to effect flow of gas from a source of supply to a distant market indicated at 3.

4 designates the market leg of the line which in the instance illustrated extends from the last station 2 to the market, and in which gas is packed to provide a primary storage during times of low demand of the market to help supply the market during times of high demand. Uniform pressure to the market is maintained by a lower pressure regulating valve 5 that is placed in the line at the town border and is set for releasing the gas at the pressure required to distribute it through the branch lines to the market and in the present drawings is indicated at 95 pounds Abs.

The regulator is ordinarily set at a pressure substantially below the maximum pressure carried in the market leg of the line but not above the maximum agreed upon generally or by contract, and, therefore, holds all gas not needed for the town's set pressure back into the trunk line to provide a primary storage. There may be a difference of some hundred pounds pressure on the two sides of a regulator, but this does not affect the feed pressure into the town system, which is substantially constant regardless of the fluctuations in demand.

In Fig. 2 of the drawings the normal maximum flow pressure for which the line was designed is indicated by the curved line 6 and drops from the station discharge pressure $P^1$ of 615 pounds to the pressure at the end of the market leg $P^2$ of 211 pounds, a drop which is necessary to effect maximum rated flow through the line. During the night time it is the practice to build up the pressure $P^2$, as indicated by the line 7, to create a primary storage indicated at 8 in the diagram illustrated in Fig. 4. In present practice this pressure is built up as high as practical during off peak periods in the winter months and reaches its highest point to meet the greater fluctuating demands at this time of the year.

As previously pointed out, pressure in the market leg of the line in excess of the pressure indicated by the line 6 in Fig. 2 limits the normal rated flow capacity of the pipe line, and, while primary storage is provided, it is at the expense of flow volume. This storage is soon depleted, and, before the maximum line flow can be effected by pulling down the pressure below the line 6, there is an interruption to the service, indicated at 9 in the diagram, Fig. 4.

As soon as the maximum line flow is established there is a secondary storage provided, but this cannot follow concurrently on depletion of the primary storage. The rate of depletion of the primary storage is diagrammatically shown in Fig. 4 by the curved line 10, and the secondary storage volume by the line 11, and the break in the service is clearly apparent because the line 10 must cross the maximum flow line 12 before the secondary storage is available.

In order to overcome and fill in the angular space between the declining line 10 and the beginning of the line 11, I provide a relief storage afforded by a relief line 13 having preferably the same capacity as the line 4 and which may extend parallel therewith for varying distances from the market determined by the volume of relief storage required. In the system illustrated the relief line 13 is connected into the market leg of the trunk line through a manually operated valve 14 and the trunk line is provided with a similar valve 15, whereby the flow of gas may be interrupted to either the relief line or the corresponding section of the trunk line.

The inlet ends of the relief line and the corresponding section 16 of the trunk line are provided with check valves 17 and 18, respectively, to prevent interflow between the sections and to trap the gas which has been discharged past the valves. The outlet ends of the sections 13 and 16 are provided with regulating valves 19 and 20, respectively, which are best illustrated in Fig. 5.

The regulating valves 19 and 20 are identical in construction and may be of any conventional type. In the form of valve illustrated, 21 designates the valve housing having inlet and outlet connections 22 and 23 communicating the ends 24 and 25 of the respective pipe line sections 13 and 16 in which the regulating valve is interposed. The inlet connection opens to an inlet chamber formed by spaced horizontally extending partitions 26 and 27 provided with aligning valve ports 28 and 29 through which gas may be discharged from the inlet chamber to the interior of the valve housing for outlet to the pipe section 25.

Engageable with the seats 30 and 31 in the respective ports 28 and 29 are valves 32 and 33 interconnected by a valve stem 34 so that the pressure acting on the under face of the valve 33 is balanced by the pressure acting on the top face of the valve 32, as in ordinary balanced valve construction. The stem 34 of the valve extends upwardly through a suitable packing 35 and is operably connected with a diaphragm 36 that is mounted in a diaphragm chamber 37 supported above the valve housing by a bracket 38. The upper face of the diaphragm 36 is exposed to the pressure of the gas in the outlet side of the valve through a branch conduit 39 connecting with the pipe section 25. Pivotally mounted on the bracket 38 is a lever 40 having one end engaging a pin 41 projecting from the valve stem 34. The opposite end of the lever forms a weight beam and is provided with a weight 42 adjustable thereon, tending to open the valves against the pressure of the gas acting on the upper face of the diaphragm to hold the valves closed.

It is thus apparent that the weight 42 may be moved on the lever so that the valves may be opened at any predetermined pressure carried at the discharge side of the valve.

The relief line 13 may be tied into the trunk line ahead of the regulators 19 and 20 by a cross-over line 43 having a shut-off valve 44, so that equalization of pressures in the respective sections 13 and 16 may be effected, if desired. If both regulators 19 and 20 are set alike, or if the valve 44 is open, then both lines become flow lines and flow through the trunk line is divided at the check valves to relieve pressure of the gas in the lines 13 and 16; consequently, increasing the volumetric rate of flow to the market. However, it is a principal purpose of the present invention to provide one flow line and one relief line wherein gas may be packed for relief storage. In this instance, the valve 44 in the cross-over line is closed and the regulator 20 is set to close at a higher pressure than the regulator 19. This will cause the line 13 to be a dead line as long as the regulator 20 will pass sufficient gas to satisfy the market demand.

While the gas is being supplied to the market through the section of the line 16, gas is being packed in the relief line up to the highest pressure occurring at the check valve 17 with practically no pressure gradient to the regulator 19.

It is thus apparent that the gas trapped in the relief line cannot go forward as long as the section of the line 16 and the regulator valve 20 can supply the market, for the regulator 19 cannot open until the pressure ahead thereof falls below its set operating pressure.

The packing of the relief line 13 is accomplished through absorption from the excess capacity of the trunk line 4 at times during the day or night when the market demand is below the capacity of the trunk line. This relief storage may be held for days as a relief supply to help out the section of the trunk line 16 whenever periods of excess demand occur or as a storage in case of line break hazards.

Under ordinary conditions the primary storage packed in the trunk line, including the section 16, affords an ample volume of gas to meet short periods of excess demand such as during breakfast periods and other fluctuating periods during the day. However, in the case of excessive demand as for heating in event of sudden drop in temperature, the demand of the market is greatly in excess of the primary storage and the primary storage is soon completely exhausted. As this occurs, the pressure in the section of the line 16 and the outlet pressure of the regulator 20 drop to allow opening of the regulator valve 19 to release the relief storage to supply the market while the secondary storage is becoming available, as indicated at 45 in the diagram, Fig. 4.

When the pressure drops below the normal line pressure at $P^2$, the secondary storage becomes available, as indicated diagrammatically in Fig. 4. The secondary flow, like the primary flow, is able to meet the excess demand for a time, and, due to the rising pressure on the discharge side of the regulator 20, the regulator 19 automatically closes, conserving the remaining relief storage. However, continued excessive demands of the market gradually exhaust the secondary storage, causing another drop in pressure ahead of the regulator 20, whereupon the regulator 19 will again open automatically to release the remaining relief storage for supplementing the dwindling secondary storage, as indicated at 46, Fig. 4.

It is thus apparent that the relief storage is released only when the primary or secondary storage, plus line flow, fail to maintain a predetermined pressure ahead of the valve 20. Therefore, flow of the relief storage reaches its peak when the line flow reaches its full maximum rated capacity and will die out after the secondary flow, plus line flow, become ample to meet the full demand. It will, however, again be released when the secondary flow, plus the line flow, cannot meet the market demand.

Under ordinary excessive demands the relief storage is sufficient to supply the market and greatly adds to the security and efficiency of the service, as well as tending to increase the earnings of the company, since a larger market may be supplied, and ordinarily it is not necessary to throw off industrials during the times of excessive demands.

The relief storage line also performs another very valuable function as it provides for creation of what I call a "sub-storage", indicated at 47, Fig. 4, which is generally the largest storage of all and is not available in other types of lines built under modern practice, as now described.

When the primary, secondary and relief storages have become exhausted, the relief line may be used either as an auxiliary transport unit for facilitating flow and particularly creating this sub-secondary storage or the relief line may continue further as a relief storage as conditions of operation make desirable. If continued as a relief storage after $P^1$ and $P^2$ have fallen to the curve indicated at 48, Figs. 2 and 3, on exhaustion of the secondary storage, the gate valve 14 may be closed, and then all the gas in the relief line may be utilized as reserve storage to complete the square, as indicated $a\ b\ c\ d$, Fig. 2.

However, a far greater storage can be made available by operating the relief line as a part of the flow lines, thereby creating the sub-storage above mentioned, which in volume may exceed the other three types of storage combined.

Through converting the relief line into a flow line when the pressure in the relief lines falls to or below that in the flow line at the check valve 17, pressure in the relief line follows downwardly the pressure in the parallel flow line, as it feeds gas into the market only when pressures in the flow line are not sufficient to supply the market unaided by the relief storage.

The relief line, therefore, usually has higher pressures than the flow line. When this condition of parallel flow lines occurs, the entire pressure relationship and flow capacity of the market leg are changed, due to the augmentation of flow through the relief line.

Flow through the relief line causes a material drop all through the market leg or system, and releases another parallel and sub-storage volume of gas indicated at 47 in the diagram, Fig. 4, which, as above stated, is generally larger in volume than the other storages combined, depending upon the proportionate length of the relief lines over the whole length of the pipe line or leg of the line as the case may be, since the increased capacity of the combined relief line and section 16 of the trunk line reduces the pressures in the market leg to materially increase the flow capacity of the line, thereby making a larger supply of gas available to meet the market demand.

In a system constructed and operated as described, the four storages flow consecutively with each other except the relief storage, and provide a larger excess storage capacity over any present system of gas transportation. Also, by arrangement of the relief storage to follow and reinforce the primary storage a greater efficiency of service and increased earning capacity of the line are provided, as well as greater security in case of a line break adjacent the market.

Relief facilities as described have advantages over gas holder storages because of the lower cost of unit volume stored, and, after the storage declines or becomes exhausted, they automatically become an important part of the transport system in establishing the sub-storage.

While it is not necessary to place a check valve in each of the sections, it is desirable because with the double check valve arrangement either of the sections may be converted into a relief line simply by reversing setting of the regulators, or both of the lines may become flow lines by opening the valve 44 in the cross-over line.

While I have particularly described the system for the transportation of natural gas, it is obvious that it may be utilized with any form of gas or elastic fluid.

What I claim and desire to secure by Letters Patent is:

1. The method of transporting gas through a pipe line to a market including compressing and expanding the gas to effect flow of a predetermined volume of gas through the line, establishing a predetermined distribution pressure at the market, establishing a predetermined line discharge pressure greater than said distribution pressure, increasing the volume of gas in the line above said flow volume to provide a primary storage in the line during time of low market demand, diverting a portion of the gas from the line at a material distance from the market for parallel flow through a relief line to establish a relief storage, drawing gas from the primary storage during time of high demand to supply said market and to reestablish said line flow for creating an available secondary storage, releasing the relief storage to the market to supplement the primary storage for maintaining said predetermined discharge pressure above the predetermined distribution pressure while the predetermined flow is being reestablished, suspending the flow from the relief storage when the secondary flow meets the demand, and releasing the relief storage during suspension of flow from the secondary storage to establish flow through both of said lines for establishing a sub-storage in the pipe line.

2. The method of transporting gas through a pipe line to a market including compressing and expanding the gas to effect flow of a predetermined volume of gas through the line, establishing a predetermined distribution pressure at the market, establishing a predetermined line discharge pressure greater than said distribution pressure to maintain a predetermined minimum volume of gas in the line, diverting a portion of the gas from the line at a material distance from the market for parallel flow through a relief line, trapping the parallel flow in the relief line to provide a relief storage during time of low demand, drawing from said relief storage subsequent to drop in pressure of the flow volume to below said predetermined discharge pressure to maintain flow through the pipe line at a pressure above said distribution pressure, and establishing a parallel flow through the relief line for supplying the market.

3. The method of transporting gas through a pipe line to a market including compressing and expanding the gas to effect flow of a predetermined volume of gas through the line, establishing a predetermined distribution pressure at the market, establishing a predetermined line discharge pressure greater than said distribution pressure, diverting a portion of the gas from the line at a material distance from the market for providing a parallel flow of gas relative to the line flow, trapping the parallel flow to provide a relief storage in time of low demand, drawing from said relief storage in time of high demand subsequent to pressure drop in the predetermined discharge pressure to retain said line pressure above said predetermined distribution pressure, and reestablishing said parallel flow for creating a sub-storage in the line for supplying the market.

4. The method of transporting gas through a pipe line to a market including compressing and expanding the gas to effect flow of a predetermined volume of gas through the line, establishing a predetermined distribution pressure at the market, establishing a predetermined line discharge pressure greater than said distribution pressure, diverting a portion of the gas from the line at a remote distance from the market for establishing a parallel flow of gas relative to the line flow, reuniting said parallel flow with the line flow at a point between said predetermined pressures, trapping the parallel flow to provide a relief storage in time of low market demand, and drawing said relief storage subsequent to drop in pressure below said predetermined discharge pressure in the line during time of high demand to retain said discharge pressure above said predetermined distribution pressure, and reestablishing flow through the line and said parallel flow to provide a substorage in the line.

5. The method of transporting gas through a pipe line including compressing and expanding the gas to effect flow of a predetermined volume of gas through the line to supply a market, diverting a part of the flow at a material distance from the market to effect a parallel flow, establishing a predetermined distribution pressure at the market, establishing a predetermined line discharge pressure, regulating the parallel flow adjacent the market to entrap said parallel flow to provide a relief storage having a pressure substantially that of the flow volume at the point of divergence, releasing said relief storage when the line flow pressure drops below said predetermined line discharge pressure to maintain the line flow pressure above said predetermined distribution pressure, and maintaining said parallel flows when the pressure of said relief storage drops below the pressure of the predetermined flow volume.

6. In a system for transporting gas to a market, a trunk line, means in the trunk line for compressing and expanding the gas to effect flow of a predetermined volume through the line, a pressure regulator connected in the market end of the trunk line for establishing a predetermined distribution pressure at the market, a pressure regulator in the trunk line for establishing a predetermined line discharge pressure greater than said distribution pressure, a relief line having substantially the same flow capacity as the trunk line and extending parallel with the trunk line, means connecting inlet and outlet ends of the relief line with the trunk line whereby gas is diverted from the trunk line for flow through the relief line, and check means in the relief line for trapping the gas to provide a relief storage during time of low market demand to supplement flow of gas through the trunk line during time of high market demand.

7. In a system for transporting gas to a market, a trunk line, means in the trunk line for compressing and expanding the gas to effect flow of a predetermined volume through the line, a relief line having free flow connection with the trunk line at a distance remote from the market and extending parallel therewith toward the market, means connecting the lines adjacent the market, and pressure regulators in said lines ahead of said connecting means having differential adjustment whereby one of the lines becomes a storage line when the other line is supplying the market and both lines become flow lines when the pressure at the connecting means drops below the set pressures of both of said regulators.

ALFRED J. DIESCHER.